United States Patent [19]

Howard, Jr.

[11] Patent Number: 4,832,663

[45] Date of Patent: May 23, 1989

[54] METHOD AND APPARATUS FOR CHANGING WIND RATIO ON PRECISION WINDER

[75] Inventor: Robert M. Howard, Jr., Charlotte, N.C.

[73] Assignee: The Bouligny Company, Charlotte, N.C.

[21] Appl. No.: 131,563

[22] Filed: Dec. 11, 1987

[51] Int. Cl.⁴ .............................................. F16H 7/00
[52] U.S. Cl. ................................ 474/88; 74/665 GE; 474/89
[58] Field of Search .................................... 474/84–89, 474/114; 74/665 GE

[56] References Cited

U.S. PATENT DOCUMENTS

| | | | |
|---|---|---|---|
| 2,550,012 | 4/1951 | Krafka | 474/88 X |
| 2,650,506 | 9/1953 | Montgomery | 474/89 |
| 3,702,570 | 11/1972 | Stikkers | 474/89 |
| 3,813,956 | 6/1974 | Whitecar | 474/88 |

Primary Examiner—Thuy M. Bui
Attorney, Agent, or Firm—W. Thad Adams, III

[57] ABSTRACT

A timing gear belt and pulley drive apparatus for a precision winder characterized by permitting a change in wind ratios by varying the speed ratio between the winder traverse assembly and the winder chuck assembly without the removal and replacement of gear pulleys. The precision winder drive apparatus comprises a drive motor for driving the chuck assembly and traverse assembly of the winder off of a common motor drive shaft. A plurality of concentric, differently toothed drive gears are mounted for rotation on the motor drive shaft for driving one of the chuck assembly or traverse assembly. A plurality of concentric, differently toothed driven gears are mounted on one of the chuck assembly or traverse assembly in belt drive alignment with the drive gears mounted on the motor drive shaft. A drive gear is mounted for rotation on the motor drive for driving a driven gear on the other of the chuck or traverse assembly. A timing belt is changeable between selected ones of the plurality of drive gear and the plurality of driven gears to change the wind ratio of the winder without changing the drive gear or the driven gear on the other of the chuck or traverse assembly.

9 Claims, 3 Drawing Sheets

METHOD AND APPARATUS FOR CHANGING WIND RATIO ON PRECISION WINDER

TECHNICAL FIELD AND BACKGROUND OF THE INVENTION

This invention relates to a belt and pulley drive apparatus and method for permitting a change in speed ratios between first and second rotating members without the removal and replacement of gear pulleys. The invention has particular application on a precision winder. A precision winder is characterized by a precise relationship between the traverse assembly and the chuck assembly. The relationship is expressed in terms of a "wind ration." The wind ratio is determined by multiplying the number of loops in one stroke of the traverse across the yarn package from one end to the other by two. This relationship is varied somewhat by the variance from the exact wind to establish the spacing of adjacent wraps, referrd to as the "gain." A particular wind ratio is selected depending upon the desired characteristics of the yarn package and the type of yarn to wound.

The ratio is established on the winding machine by the selection of appropriately sized pulleys, typically driven by timing belts. An electric motor drives both a traverse assembly and a chuck assembly off of a single shaft by means of concentrically mounted pulleys. In all, four pulleys establish the speed of rotation of the chuck and the speed of the traverse—the two pulleys on the motor shaft and driven pulleys on the traverse and chuck assemblies.

The prior art method of changing the wind ratio involves the calculation of the required pulley sizes, removing all four of the pulleys from the winder and replacing the pulleys with four other pulleys which give the required wind ratio. This requires a substantial period of time, especially when a large number of machines must be changed on short notice within the time requirements of a production schedule. Changing the pulleys in this manner also requires a large stock of replacement gears in a large number of sizes. It has also been observed that maintenance personnel will make mistakes in a certain percentage of cases, requiring further changes and consequent loss of production.

While there is a virtually endless number of actual wind ratios, a relatively small number are adequate for most purposes. There is also an extremely large number of combinations of pulley combinations within the usual range of pulley sizes which will give desired wind ratios. Heretofore, the large number of combinations has required that the pulley sizes be calculated manually and the resulting pulley sizes installed on the winder. As a practical matter this always requires the replacement of all four pulleys, as described above.

As a first step in making a substantial improvement in the efficiency with which wind ratios are changed, a computer program was devised which generates combinations of pulley sizes in tabular form for a given set of operating criteria. In reviewing this data, it was discovered that in a percentage of cases, perhaps 20-30 in from several hundred to several thousand pulley combinations, the motor pulley which drives the chuck assembly and the chuck pulley are the same size for several different wind ratios, with the variation in wind ratio being the result of a change in only the motor pulley which drives the traverse assembly and the traverse pulley. In view of this discovery, the winder can be constructed with a single chuck pulley and the motor pulley which drives the chuck. A desired number of variant wind ratios can be installed on the winder by placing from two to four pulleys concentrically on the motor shaft for driving the traverse assembly, and also placing from two to four pulleys concentrically on the traverse assembly. These pulleys are selected from the computer generated tables referred to above. The wind ratio changes can now be made by simply changing the timing belt from one set of pulleys to another without removing and replacing pulleys.

SUMMARY OF THE INVENTION

Therefore, it is an object of the invention to provide a belt and pulley drive apparatus and method for permitting a change in speed ratios between first and second rotating members without the removal and replacement of gear pulleys.

It is another object of the invention to provide a means of changing of the wind ratio of a precision winder without requiring a stockpile of replacement gears.

It is another object of the invention to provide an apparatus and method of changing the wind ratio of a precision winder quickly and accurately.

These and other objects of the present invention are achieved in the preferred embodiments disclosed below by providing a belt and pulley drive apparatus for permitting a change in speed ratios between first and second rotating members without the removal and replacement of gear pulleys, the drive apparatus comprising a drive motor for driving the first and second members off of a common drive shaft. A plurality of concentric drive gears are mounted for rotation on the drive shaft for driving one of the first or second members and a plurality of concentric driven gears are mounted on one of the first or second members in belt drive alignment with the drive gears mounted on the motor drive shaft. A drive gear is mounted for rotation on the motor drive for driving a driven gear on the other of the first or second members. A belt is changeable between selected ones of the plurality of drive gears and the plurality of driven gears to change the speed ratio of the first and second members without changing the drive gear or the driven gear on the other of the first and second members.

In accordance with the specific embodiment of the invention disclosed in this application a timing gear belt and pulley drive apparatus is provided for a precision winder characterized by permitting a change in wind ratios by varying the speed ratio between the winder traverse assembly and the winder chuck assembly without the removal and replacement of gear pulleys. The precision winder drive apparatus comprises a drive motor for driving the chuck assembly and traverse assembly of the winder off of a common motor drive shaft. A plurality of concentric, differently toothed drive gears are mounted for rotation on the motor drive shaft for driving one of the chuck assembly or traverse assembly. A plurality of concentric, differently toothed driven gears are mounted on one of the chuck assembly or traverse assembly in belt drive alignment with the drive gears mounted on the motor drive shaft. A drive gear is mounted for rotation on the motor drive for driving a driven gear on the other of the chuck or traverse assembly. A timing belt is changeable between selected ones of the plurality of drive gears and the plurality of driven gears to change the wind ratio of the winder without changing the drive gear or the driven gear on the other of the chuck or traverse assembly.

Preferably, a plurality of concentric, differently toothed driven gears are mounted on the traverse assembly in belt drive alignment with the drive gears mounted on the motor drive shaft.

According to one preferred embodiment of the invention, the plurality of concentric, differently toothed driven gears mounted on the traverse assembly comprise three such gears and the plurality of concentric, differently toothed drive gears on the motor drive shaft comprise three such gears.

According to another preferred embodiment of the invention, each of the three gears mounted on the traverse assembly are mounted in belt drive relation with a one of the three gears mounted on the drive shaft.

According to another preferred embodiment of the invention, the motor includes mounting means for shifting the position of the motor in relation to the traverse assembly to compensate for a change of distance between the gear pulleys upon changing the wind ratio.

The method of the invention comprises changing the wind ratio of a winder of the type wherein a traverse assembly and chuck assembly are each driven from a motor by means of timing belts and gear pulleys without removal and replacement of one or more gear pulleys by performing the steps of determining a two or more desired wind ratios for a winder and determining the highest and lowest practical number of gear teeth on each of the gear pulleys. The possible wind ratios for each combination of gear sizes with range of the highest and lowest number of practical gear teeth is calculated. Then, a selection from the calculated wind ratios gear combinations provides two or more desired wind ratios wherein pulley sizes of at least two of the pulleys remain constant from one wind ratio to the other. The method proceeds by mounting one of the constant sized pulleys on the motor, mounting the other of the constant sized pulleys on one of the traverse or chuck in timing belt driving relation to the pulley on the motor and mounting two or more gears on the motor and two or more gears on the other of the traverse or chuck to thereby define at least two sets of wind change gears, each of which provide a different desired wind ratio when engaged and driven together with the constant sized pulleys. The winder is operated by driving the desired set of wind change gears together with the constant sized gears to provide the desired wind ratio.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
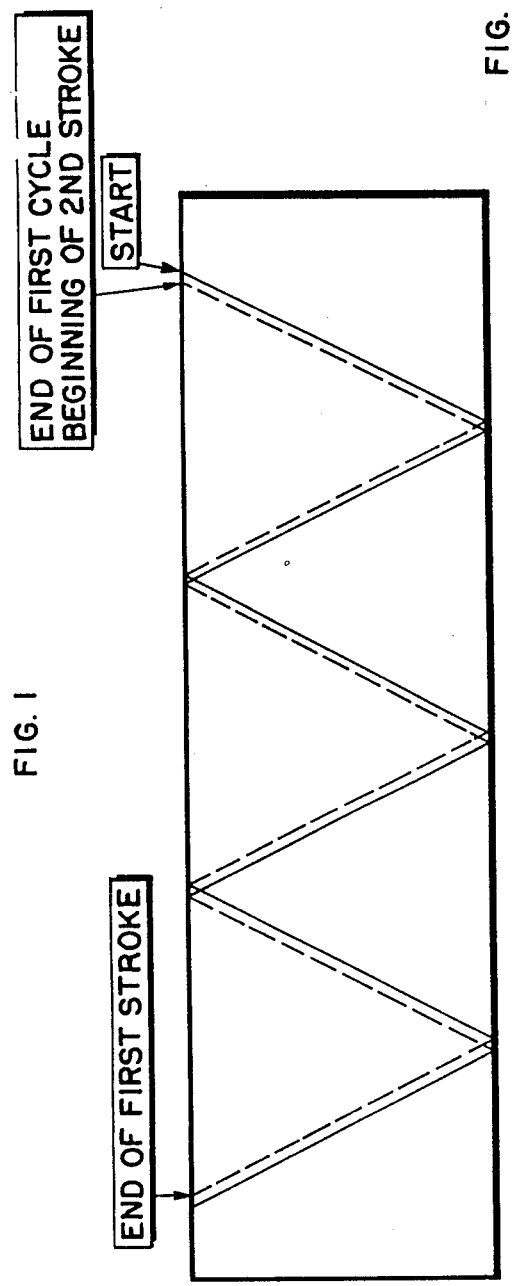
FIG. 1 is a diagram of the wind construction of a yarn package wound on a winder of the type to which this invention relates.

Referring now specifically to the drawings, a diagram of the wind construction on a yarn package is illustrated in FIG. 1 and will be explained briefly by way of background. A precision winder operates by reason of two simultaneous motions. A chuck holds a cylindrical or conical package and rotates it at a set speed. A traverse assembly applies a moving yarn to the surface along the length of the package as it rotates. This combination movement forms a set number of helical loops along the length of the package. The relationship between the speed of rotation of the chuck and the lateral travel along the yarn package is precisely controlled by some direct drive mechanism such as gear pulleys and timing belts. Hence the term "precision" is applied to the winder.

Yarn is applied to the package at a nominal "Start" position and a predetermined number of loops are applied to the surface of the package. In FIG. 1, three loops are applied to the package from one side of the package to the other ("stroke"). The number of loops in one stroke is referred to as the "wind." A "cycle" is a single back-and-forth trip of the traverse, and the "wind ratio" refers to twice the "wind", or the number of loops in one cycle.

In order to prevent the yarn from successive cycles from laying directly one top of each other, spacing must be provided between each loop. Usually, the spacing is very slightly greater that the width of the yarn, and the variance from the exact wind necessary to establish this spacing is referred to as the "gain." Therefore, the "actual wind ratio" is the wind ratio plus or minus the required gain. As is shown in FIG. 1, the spacing is the distance between "Start" and the adjacent beginning of the second stroke.

The actual wind ratio must therefore be changed when different yarn constructions are wound. As described above, prior art winders require that gear pulley sizes be computed for a given desired wind ratio. Typically, this requires removing and replacing three and perhaps four gear pulleys—a chuck drive gear pulley and a traverse drive gear pulley on the motor, a chuck driven gear pulley and a traverse driven gear pulley.

Figure 2:
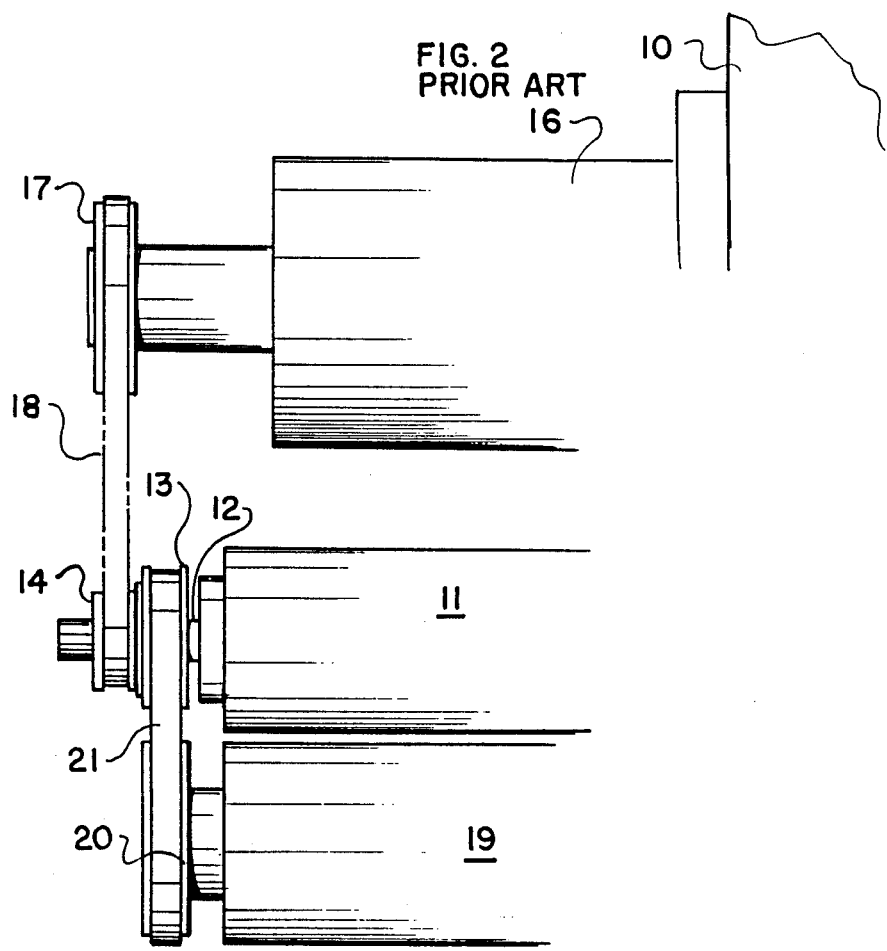
FIG. 2 is a side elevation winder gearing diagram according to the prior art.

This is shown in FIG. 2, where winder 10 is driven by a motor 11 having a drive shaft 12 one which are mounted a chuck drive gear pulley 13 and a traverse drive gear pulley 14. A traverse 16 is driven by a traverse driven gear pulley 17 by means of a timing belt 18. A chuck 19 is driven by a chuck driven gear pulley 20 by means of a timing belt 21. The relationship of the number of teeth on the gears to one another determined the wind ratio.

As is apparent, the possible combinations and permutations of gear pulley sizes within a set of four gear pulleys is quite high—on the order of 6.5 million within the practical range of gear pulley sizes. The possibility of manually calculating gear pulley sizes for different wind ratios having two or more constant gear pulley sizes is therefore almost impossible.

A computer program has been developed which accepts parameters regarding desired wind ratios and generates possible ratios from this information. The parameters are as follows: cam stroke; cam turns per stroke; maximum velocity; maximum and minimum motor velocity; wind; N where N=yarn layer in which spacing is present; gain; desired spacing; after wind ratio and exact pulley ratio required. The computer generates tables which includes four proposed gear pulley sizes which will deliver the parameters specified in the program.

A low percentage of these possible wind ratios are characterized by having at least one gear pulley set (two gear pulleys) in common. By sorting the wind ratios according to common gear pulleys sets, a precision winder can be constructed with the provision of changing from one wind ratio to another simply by adjusting the motor position slightly and shifting a timing belt from one set of pulleys to another.

Figure 4:
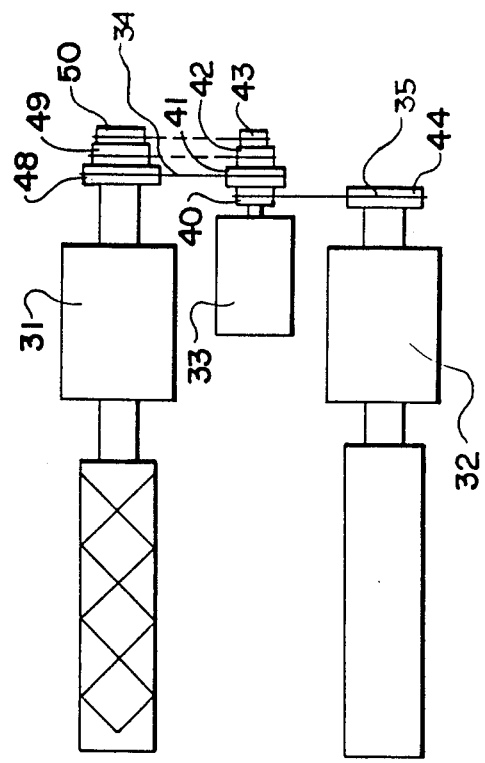
FIG. 4 is a side elevation winder gearing diagram according to an embodiment of the present invention.
Figure 3:
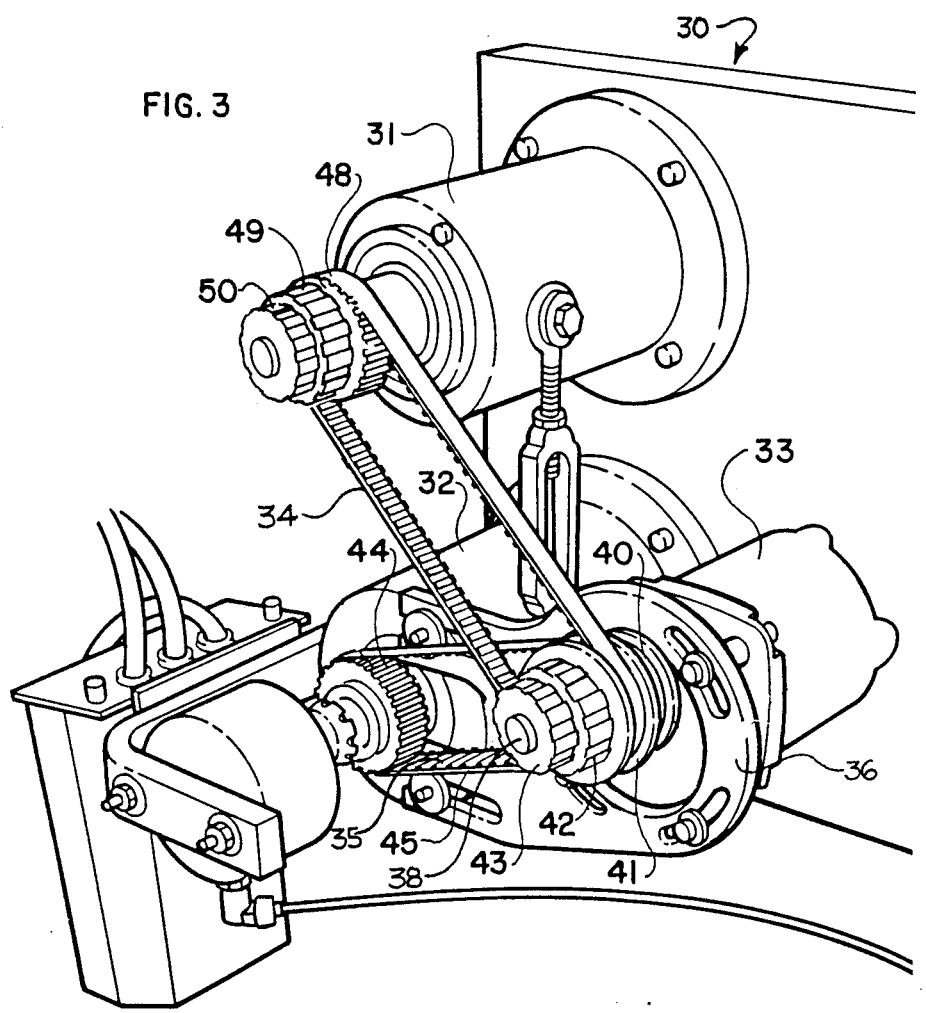
FIG. 3 is a perspective view of a winder gear arrangement according to the present invention.

Referring now to FIG. 3, a drive apparatus according to an embodiment of the invention is shown. The winder 30 includes a traverse assembly 31 and a chuck assembly 32 driven by a motor 33 through timing belts 34 and 35. Motor 33 is mounted for adjustment relative to the traverse and chuck assemblies 31, 32 on a motor mounting bracket 36. Motor drives both the traverse and chuck assemblies 31, 32 through a common shaft 38. Further explanation is now made with reference to FIG. 4, where it can be seen that motor shaft 38 is provided with four gear pulleys, 40, 41, 42 and 43. chuck assembly 32 is driven by a driven chuck gear pulley 44 through timing belt 35 mounted on gear pulley 40. The size of gear pulleys 40 and 44 is determined by computer and remains constant as the wind ratio of the winder 30 is changed. As is shown in FIG. 4, the traverse assembly 31 is provided with three different sized gear pulleys 48, 49 and 50. These pulleys are mounted in driven relation by a timing belt 51 on a selected one of gear pulleys 41, 42 and 43, respectively, on motor 33.

Therefore, three different wind ratios can be selected by loosening the motor mount 36 (see Fig. 3) and sliding the motor 33 towards the traverse and chuck assemblies 31, 32 in order to loosen belts 35 and 34. Once loosened, belt 34 is moved over onto the desired new gear pulley. The motor 33 is adjusted to properly tighten both belts 35 and 34, and the winder 30 is ready to wind packages with the new wind ratio. This adjustment is significantly less time consuming and less expensive than the prior art method of removing and replacing the gear pulleys.

Variations are possible, of course. Two or any practical greater number of pulleys can be placed on the traverse assembly 31 or the chuck assembly 32 can be provided with the two or more sets of pulleys, and the constant size pulley placed on the traverse assembly 31. A method and apparatus for permitting changes in the wind ratio of a winder without removing and replacing pulleys is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. A timing gear belt and pulley drive apparatus for a precision winder characterized by permitting a change in wind ratios by varying the speed ratio between a winder traverse assembly and winder chuck assembly without the removal and replacement of gear pulleys, said drive apparatus comprising:
    (a) a drive motor for driving the chuck assembly and traverse assembly of the winder off of a drive shaft;
    (b) a plurality of concentric drive gears mounted for rotation on said drive shaft for driving one of the chuck assembly or traverse assembly;
    (c) a plurality of concentric driven gears mounted on one of the chuck assembly or traverse assembly in belt drive alignment with the drive gears mounted on the drive shaft;
    (d) a drive gear mounted for rotation on said motor drive for driving a driven gear on the other of the chuck or traverse assembly; and
    (e) a timing belt being changeable between selected ones of the plurality of drive gears and the plurality of driven gears to change the wind ratio of the winder without changing the drive gear or the driven gear on the other of the chuck or traverse assembly.

2. A timing gear belt and pulley drive apparatus according to claim 1, wherein said plurality of concentric driven gears are mounted on the traverse assembly in belt drive alignment with the drive gears mounted on the drive shaft.

3. A timing gear belt and pulley drive apparatus according to claim 2, wherein said plurality of concentric driven gears mounted on the traverse assembly comprise three such gears and said plurality of concentric drive gears on said drive shaft comprise three such gears.

4. A timing gear belt and pulley drive apparatus according to claim 3, wherein each of the three gears mounted on the traverse assembly are mounted in belt drive relation with a one of the three gears mounted on said drive shaft.

5. A timing gear belt and pulley drive apparatus according to claim 1, 2, or 3 wherein said motor includes mounting means for shifting the position of the motor in relation to said traverse assembly to compensate for a change of distance between the gear pulleys upon changing the wind ratio.

6. A method of changing the wind ratio of a winder of the type wherein a traverse assembly and chuck assembly are each driven from a motor by means of timing belts and gear pulleys without removal and replacement of one or more gear pulleys, and comprising the steps of:
    (a) determining a two or more desired wind ratios for a winder;
    (b) determining the highest and lowest practical number of gear teeth on each of the gear pulleys;
    (c) calculating the possible wind ratios for each combination of gear sizes with range of the highest and lowest number of practical gear teeth;
    (d) selecting from the calculated wind ratios gear combinations providing the two or more desired wind ratios wherein pulley sizes of at least two of the pulleys remain constant from one wind ratio to the other;
    (e) mounting one of the constant sized pulleys in driving relation to the motor;
    (f) mounting the other of the constant sized pulleys on one of the traverse or chuck in timing belt driving relation to the pulley on the motor;
    (g) mounting two or more gears on the motor and two or more gears on the other of the traverse or chuck to thereby define at least two sets of wind change gears, each of which provide a different desired wind ratio when engaged and driven together with the constant sized pulleys; and (h) operating the winder by driving the desired set of wind change gears together with the constant sized gears to provide the desired wind ratio.

7. A method according to claim 6, wherein the step of mounting the other of the constant sized pulleys on one of the traverse or chuck in timing belt driving relation to the pulley on the motor comprises mounting the other of the constant sized pulleys on the traverse.

8. A method according to claim 6, wherein the step of mounting the other of the constant sized pulleys on one of the traverse or chuck in timing belt driving relation to the pulley on the motor comprises mounting the other of the constant sized pulleys on the chuck.

9. A method according to claim 6, wherein the step of mounting the two or more gears on the motor and the two or more gears on the other of the traverse or chuck to thereby define at least two sets of wind change gears comprises mounting a pair of differently sized gears on the other of the traverse or chuck.

* * * * *